United States Patent [19]

Funato

[11] Patent Number: 5,175,642
[45] Date of Patent: Dec. 29, 1992

[54] LIGHT SOURCE UNIT CAPABLE OF CHANGING SIZE OF LIGHT BEAM SPOT AND OPTICAL SCANNING IMAGE RECORDING APPARATUS USING THE SAME

[75] Inventor: Hiroyoshi Funato, Chigasaki, Japan

[73] Assignee: Ricoh Company, Ltd., Tokyo, Japan

[21] Appl. No.: 632,154

[22] Filed: Dec. 21, 1990

[30] Foreign Application Priority Data

Dec. 27, 1989 [JP] Japan .................................. 1-341973
Feb. 21, 1990 [JP] Japan .................................. 2-40740
Feb. 22, 1990 [JP] Japan .................................. 2-42240

[51] Int. Cl.⁵ .......................... G02B 26/08; G02B 6/10; G02F 1/33; G02F 1/29
[52] U.S. Cl. .................................. 359/298; 359/305; 359/315; 385/7; 385/8; 385/129
[58] Field of Search .............. 359/285, 245, 301, 302, 359/305, 306, 315, 319, 298; 385/7, 8, 129, 130, 131

[56] References Cited

U.S. PATENT DOCUMENTS

| | | | |
|---|---|---|---|
| 4,425,023 | 1/1984 | Matsumoto et al. | 359/285 |
| 4,639,073 | 1/1987 | Yip et al. | 359/315 |
| 4,929,044 | 5/1990 | Arimoto et al. | 385/7 |
| 5,052,771 | 10/1991 | Williams et al. | 385/130 |

FOREIGN PATENT DOCUMENTS

113018  5/1986  Japan .
296069 12/1988  Japan .

Primary Examiner—Eugene R. LaRoche
Assistant Examiner—Evelyn A. Lester
Attorney, Agent, or Firm—Cooper & Dunham

[57] ABSTRACT

A light source unit comprises a laser unit for emitting a laser beam; a deflection element for deflecting the laser beam emitted from the laser unit and for outputting a deflected laser beam, a deflection angle of the deflected laser beam being controlled by a control signal supplied from an external controller to the deflection element; and a shading member for partly or entirely shading the deflected laser beam output from the deflection element, a spot size of a laser beam passing through the shading member being changed in accordance with the deflection angle of the deflected laser beam. The light source unit outputs the laser beam passing through the shading element. An optical scanning image recording apparatus using the above light source unit comprises the light source unit described above, a recording medium on which an image is formed by an optical scanning, and an optical system which moves the light beam output from the light source unit so that the light beam moved by the optical system scans a surface of the recording medium.

26 Claims, 9 Drawing Sheets

LIGHT SOURCE UNIT CAPABLE OF CHANGING SIZE OF LIGHT BEAM SPOT AND OPTICAL SCANNING IMAGE RECORDING APPARATUS USING THE SAME

BACKGROUND OF THE INVENTION

The present invention generally relates to a light source unit and an optical scanning image recording apparatus, and more particularly to a light source unit capable of changing the size of a light beam spot, and an optical scanning recording apparatus using the same, used in laser printers and the like.

Recently, an optical scanning recording apparatus has been developed. In this optical scanning recording apparatus, a laser beam modulated in accordance with information supplied from a computer, a word processor or the like scans an image forming medium such as a photosensitive member so that a latent image is formed on the surface of the image forming medium. Then, a dot image based on the latent image formed on the image forming medium is formed on a recording sheet.

In this type of optical scanning recording apparatus, various methods of controlling a dot size which is the size of a laser beam spot projecting onto the image forming medium have been proposed in order to obtain a half-tone image. For example, Japanese Laid-Open Patent Application No. 61-113018 discloses an optical scanning recording apparatus in which the size of a laser beam spot is controlled by use of a flare stop. That is, the size of the flare stop is controlled by a controller so that the size of the laser beam spot projecting onto the image forming medium is changed. In addition, Japanese Laid-Open Patent Application No. 63-296069 discloses an optical scanning recording apparatus in which the intensity of the laser beam is controlled so that the size of the laser beam spot projecting onto the image forming medium is changed. In this apparatus, when image information of two adjacent dots corresponds to a case where the laser beam does not project onto the image forming medium, the dot size is enlarged so as to prevent a line image from being separated.

In the optical scanning recording apparatus disclosed in Japanese Laid-Open Patent Application No. 61-113018, a mechanical flare stop, a liquid crystal flare stop or the like is used as the flare stop. The response of each of the above types of flare stops is slow so that it is difficult to rapidly record the half-tone image.

In the optical scanning recording apparatus disclosed in Japanese Laid-Open Patent Application No. 63-296069, the intensity of the laser beam is changed s that it is difficult to sufficiently change the dot size of the image formed on the image forming medium.

SUMMARY OF THE INVENTION

Accordingly, a general object of the present invention is to provide a novel and useful optical scanning image recording apparatus in which the disadvantages of the aforementioned prior art are eliminated.

A more specific object of the present invention is to provide a light source capable of easily changing the size of the light beam spot.

The above objects of the present invention are achieved by a light source comprising light emitting means for emitting a light beam; deflection means, coupled to the light emitting means, for deflecting the light beam emitted from the light emitting means and for outputting a deflected light beam, a deflection angle of the deflected light beam being controlled by a control signal supplied from an external controller to the deflection means; and shading means, coupled to the deflection means, for partly or entirely shading the deflected light beam output from the deflection means, a spot size of a light beam passing through the shading means being changed in accordance with the deflection angle of the deflected light beam, wherein the light source unit outputs the light beam passing through the shading means.

Another object of the present invention is to provide an optical scanning image recording apparatus capable of easily and rapidly forming the half-tone image on the image forming medium.

The above objects of the present invention are achieved by an optical scanning image recording apparatus comprising the above light source unit and a recording medium on which an image is formed by an optical scanning; and an optical system provided between the light source unit and the recording medium, the optical system deflecting the light beam output from the light source unit so that the light beam deflected by the optical system scans a surface of the recording medium.

Additional objects, features and advantages of the present invention will become apparent from the following detailed description when read in conjunction with the accompanying drawings.

DESCRIPTION OF THE PREFERRED EMBODIMENTS

A description will now be given of a first embodiment of the present invention with reference to FIGS. 1 through 4.

Figure 1:
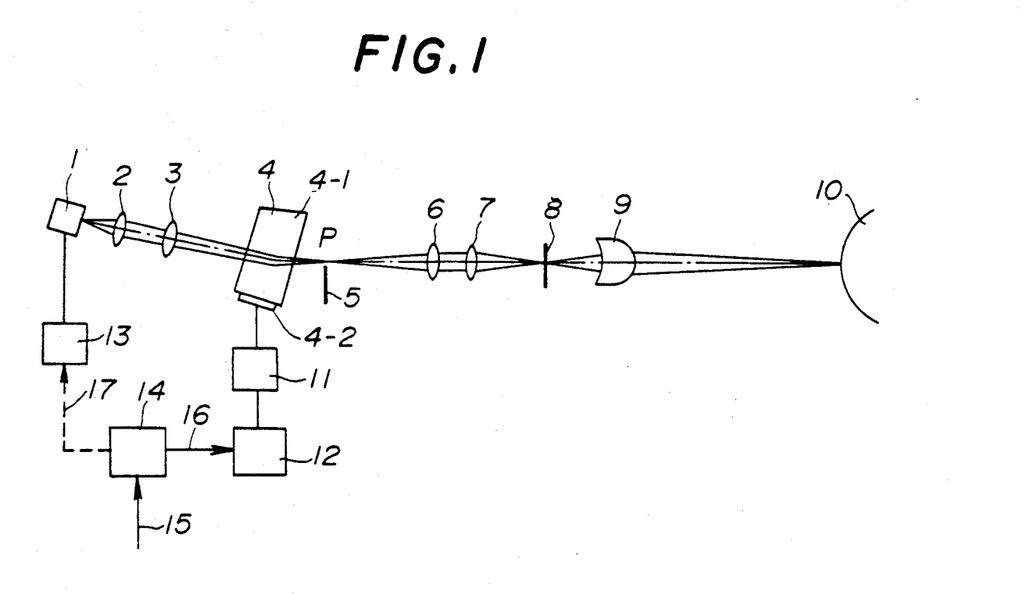
FIG. 1 is a diagram illustrating an optical scanning image recording apparatus including a light source unit according to a first embodiment of the present invention.
Figure 2:
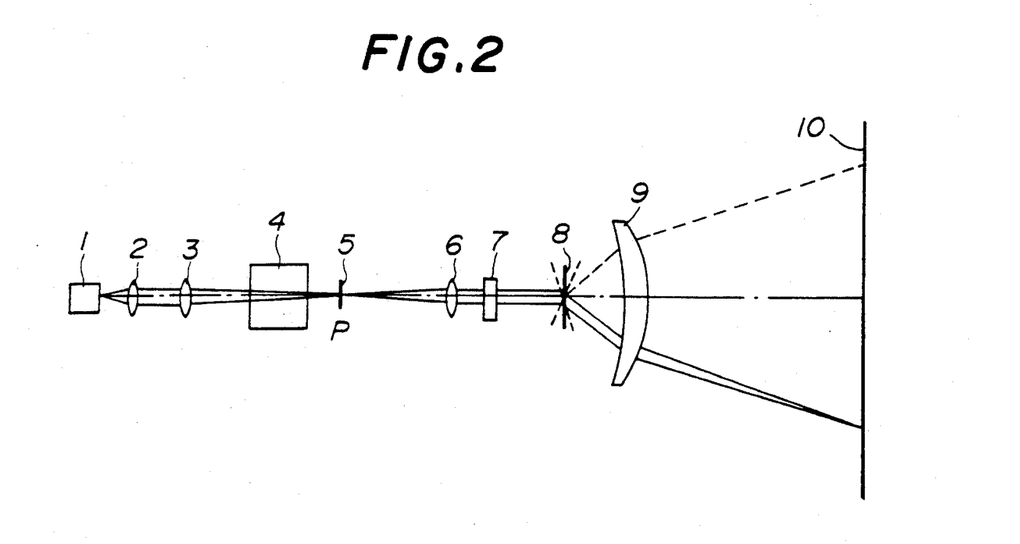
FIG. 2 is a plan view showing an optical system in the optical scanning image recording apparatus shown in FIG. 1.

FIG. 1 is a block diagram illustrating an optical scanning image recording apparatus according to the first embodiment of the present invention. FIG. 1 shows a side view of an optical system of the optical scanning image recording apparatus. FIG. 2 shows a plane or top view of the optical system of the optical scanning image recording apparatus shown in FIG. 1.

Referring to FIGS. 1 and 2, a semiconductor laser unit 1 continuously oscillates and emits a laser beam. A gas laser unit such as a He-Ne laser unit or another laser unit can also be used as a light source of the optical scanning image recording apparatus. The laser beam emitted from the semiconductor laser unit 1 passes through a collimator lens 2 and a focusing lens 3. The collimator lens 2 collimates the laser beam emitted from the semiconductor laser 1. The focusing lens 3 focuses the laser beam at a predetermined position. The laser beam output from the focusing lens 3 passes through an acoust-optic deflection element 4. The acoust-optic deflection element 4 has an ultrasonic medium 4-1 and an ultrasonic transducer 4-2. The ultrasonic medium 4-1 is made of a material such as PbMoO₄ (lead molybdate), TeO₂ or dense flint glass. The ultrasonic transducer 4-2 is made of a material such as LiNbO₃. The ultrasonic medium 4-1 and the ultrasonic transducer 4-2 are adhered to each other so that an electrode is put between the ultrasonic medium 4-1 and the ultrasonic transducer 4-2. When a FR frequency signal is supplied to the ultrasonic transducer 4-2, an ultrasonic wave generated by the ultrasonic transducer 4-2 is propagated in the ultrasonic medium 4-1 and thus a phase grating is generated in the ultrasonic medium 4-1. The laser beam passing through the acoust-optic deflection element 4 is diffracted by the phase grating generated in the ultrasonic medium 4-1. The diffraction angle of the laser beam passing through the acoust-optic deflection element 4 can be controlled by changing the frequency of the FR frequency signal supplied to the ultrasonic transducer 4-2. That is, the laser beam passing through the acoust-optic deflection element 4 is deflected at a deflection angle corresponding to the controlled diffraction angle thereof.

A shading plate 5 having a knife-edge is provided on a plane P on which the laser beam is focused by the focusing lens 3. The knife-edge of the shading plate 5 extends in a direction perpendicular to a direction in which the laser beam is deflected by the acoust-optic deflection element 4. The laser beam passing through the knife-edge of the shading plate 5 further passes through a collimator lens 6 and cylindrical lens 7. The laser beam truncated by the knife-edge of the shading plate 5 is collimated by the collimator lens 6.

The laser beam collimated by the collimator lens 6 passes through the cylindrical lens 7 and is incident on a polygonal mirror 8 rotating in a predetermined direction. The laser beam reflected by the polygonal mirror 8 passes through an anamorphic f-θ lens 9 and is projected onto the surface of a photosensitive member 10 which is used as a image forming medium. The laser beam is deflected in a predetermined direction within a predetermined angle range when the polygonal mirror 9 is rotated, so that the deflected laser beam scans the surface of the photosensitive member 10. A direction in which the laser beam scans the surface of the photosensitive member 10 is referred to as a main scanning direction. A direction perpendicular to the main scanning direction is referred to as a sub scanning direction. In the anamorphic f-θ lens 9, a focal length in the main scanning direction and a focal length in the sub scanning direction differ from each other. The focal length of the anamorphic f-θ lens 9 in the main scanning direction is determined so that the laser beam passing through the anamorphic f-θ lnes 9 is collimated and focused on the surface of the photosensitive member 10 with respect to the main scanning direction. The focal length thereof in the sub scanning direction is determined so that a laser beam spot on the surface of the polygonal mirror 8 is imaged to the surface of the photosensitive member 10 with respect to the sub scanning direction. That is, with respect to the sub scanning direction, the surface of the polygonal mirror 8 and the surface of the photosensitive member 10 have a conjugate relationship of imaging.

In addition, an optical system having a spherical type f-θ lens and a cylindrical lens can be substituted for the anamorphic f-θ lens 9.

A FR frequency power amplifier 11 supplies a FR frequency signal to the ultrasonic transducer 4-2. A voltage control oscillator 12 controls a oscillation frequency on the basis of an input voltage and supplies a signal having the controlled frequency to the FR frequency power amplifier 11. A driver 13 drives the semiconductor laser unit 1. A controller 14 inputs the image signal 15 supplied from a computer or the like and outputs a control signal 16 and a driving pulse signal 17 corresponding to the image signal 15. The control signal 16 is supplied to the frequency power amplifier 11 and the driving pulse 17 is supplied to the driver 13.

The controller 14 generates the control signal 16 in synchronism with an image clock signal corresponding to a pixel train in an image signal in accordance with a half-tone level of the image signal 15. The voltage control oscillator 12 outputs the signal having a frequency corresponding to the control signal 16. The FR frequency power amplifier 11 supplies the amplified FR frequency signal corresponding to the signal output from the voltage control oscillator 12 to the ultrasonic transducer 4-2.

In this case, when the Bragg condition regarding the diffraction is satisfied, the small deflection angle $\Delta\theta_r$ of the laser beam output from the acoust-optic deflection element 4 is calculated by the following formula.

$$\Delta\theta_r = \lambda \cdot \Delta f_a / v_a \tag{1}$$

where $\lambda$ is a wave length of the light, $\Delta f_a$ is a frequency variation of the FR frequency signal supplied to the acoust-optic deflection element 4 and $v_a$ is a velocity of the ultrasonic wave.

According to the formula (1), the small deflection angle $\Delta\theta_r$ of the laser beam output from the acoust-optic deflection element 4 is in proportion to the frequency variation $\Delta f_a$ of the signal supplied to the acoust-optic deflection element 4. The dot size can be changed by use of the relationship indicated by the above formula (1).

Figure 3A:
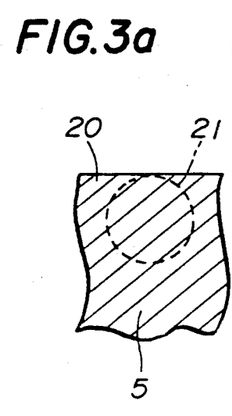
FIG. 3a, 3b and 3c are diagrams illustrating relationships between a shading member and the laser beam spot.
Figure 3B:
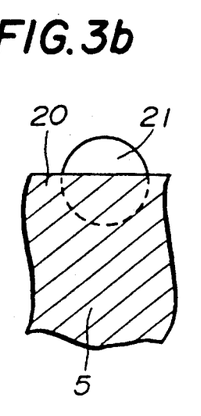
Figure 3C:
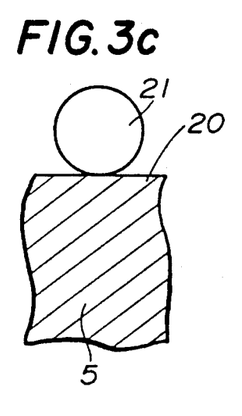
Figure 4A:
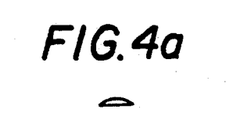
FIG. 4a–4g are diagrams illustrating variations of the laser beam spot.
Figure 4B:
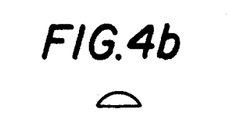
Figure 4C:
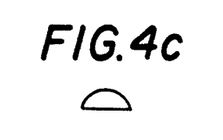
Figure 4D:
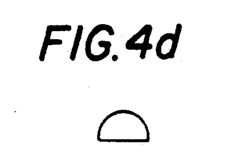
Figure 4E:
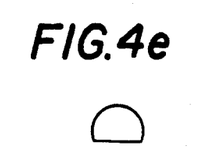
Figure 4F:
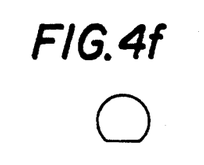
Figure 4G:
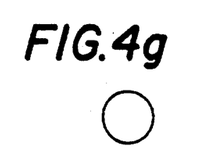

FIG. 3 is a diagram illustrating a relationship between the knife-edge 20 of the shading plate 5 and the laser beam spot 21. In FIG. 3, (a) (b) and (c) respectively show the surface of the shading plate 5, which surface faces the collimator lens 6.

When the signal having the frequency $f_1$ is supplied to the acoust-optic deflection element 4, the laser beam is deflected by the acoust-optic deflection element 4 so that the laser beam output from the acoust-optic deflection element 4 is completely intercepted by the knife-edge 20 of the shading plate 5, as shown in FIG. 3 (a). When the signal having the frequency $f_2$ is supplied to the acoust-optic deflection element 4, the laser beam is deflected by the acoust-optic deflection element 4 so that half of the laser beam output from the acoust-optic deflection element is intercepted by the knife-edge 21 of the shading plate 5, as shown in FIG. 3 (b). When the signal having the frequency $f_3$ is supplied to the acoust-optic deflection element 4, the laser beam is deflected by the acoust-optic deflection element 4 so that the laser beam output from the acoust-optic deflection element 4 entirely passes through the knife-edge 21 of the shading plate 5.

In this case, the following formulas (2) and (3) stand.

$$d\Delta\theta r_{max} = W_p \quad (2)$$

$$\Delta\theta r_{max} = \lambda \cdot \Delta f_{max}/v_u \quad (3)$$

where $\Delta f_{max}$ denotes a maximum frequency difference so that $\Delta f_{max} = f_3 - f_1$, $W_p$ denotes a diameter of the laser beam spot focused by the focusing lens 3 on the plane P on which the knife-edge 21 is provided, d denotes a distance between a position where the laser beam is deflected by the acoust-optic deflection element 4 and the plane P, and $\Delta\theta r_{max}$ denotes an angle difference between an exit angle of the laser beam output from the acoust-optic deflection element 4 in a case shown in FIG. 3 (a) and an exit angle of the laser beam output from the acoust-optic deflection element 4 in a case shown in FIG. 3 (c). The following formula (4) is obtained from the above formulas (2) and (3).

$$d\lambda \cdot \Delta f_{max}/v_a = W_p \quad (4)$$

Here, when the distance (d), the maximum frequency difference ($\Delta f_{max}$) and the diameter ($W_p$) are determined so that the formula (4) stands, the laser beam can be located at a position within a range between a first position shown in FIG. 3 (a) and a second position shown in FIG. 3 (c).

The image of the plane P on which the knife-edge 21 is provided is formed on the surface of the photosensitive member 10 by the collimator lens 6, the cylindrical lens 7 and the anamorphic f-$\theta$ lens 9. That is, the plane P and the surface of the photosensitive member 10 have the conjugate relationship of imaging. Thus, the laser beam spots as shown in FIG. 3 are either enlarged or reduced and projected onto the surface of the photosensitive member 10.

FIG. 4 shows various examples of the laser beam spots projected onto the surface of the photosensitive member 10.

Referring to FIG. 4, when only a light portion of the laser beam passes through the knife-edge 21 of the shading plate 5, the laser beam spot shown in FIG. 4 (a) is projected onto the surface of the photosensitive member 10. When half of the laser beam spot appears from the knife-edge 21, the laser beam spot shown in FIG. 4 (d) is projected onto the surface of the photosensitive member 10. When the laser beam entirely passes through the knife-edge 21, the laser beam spot shown in FIG. 4 (g) is projected onto the surface of the photosensitive member 10.

As has been described above, when the frequency of the FR frequency signal supplied to the acoust-optic deflection element 4 is controlled in accordance with a condition indicated by the formula (4), the size of the laser beam spot is successively changed, as shown in FIG. 4. Thus, the dot size on the image formed on the recording sheet can be changed.

The speed with which the size of the laser beam spot projected onto the surface of the photosensitive member 10 is changed depends on a access time $t_a$ of the acoust-optic deflection element 4. The access time $t_a$ is obtained by the following formula (5).

$$t_a = D/v_u \quad (5)$$

where D is a diameter of a light beam in the acoust-optic deflection element 4. When the ultrasonic medium 4-1 is made of $PbMoO_4$ (lead molybdate), $$v_u = 3.66 \cdot 10^3 \ m/sec.$$

Thus, when $D = 150 \ \mu m$, the access time $t_a$ is approximately 41 nsec ($t_a \div 41$ nsec.) due to the above formula (5). In this case, the dot size can be rapidly changed, so that it is possible to change the dot size of every pixel on the half-tone image.

A description will now be given of a second embodiment of the present invention with reference to FIGS. 5 through 11.

Figure 5A:
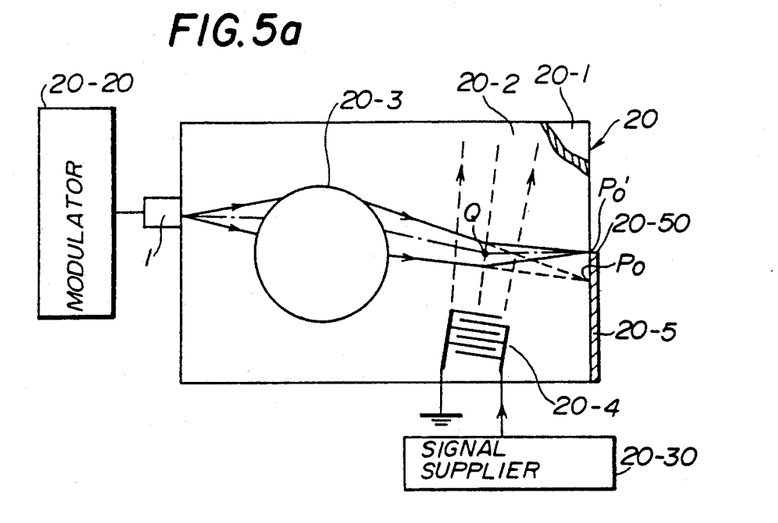
FIG. 5a and 5b are diagrams illustrating a light source unit according to a second embodiment of the present invention.
Figure 5B:
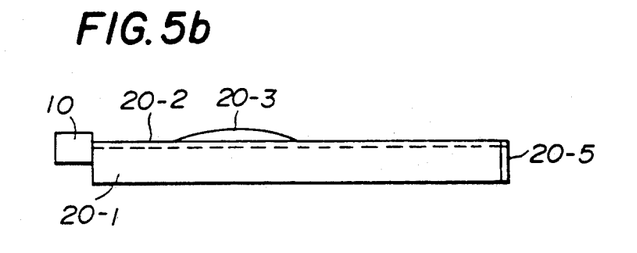

FIG. 5 shows a light source unit according to the second embodiment of the present invention.

Referring to FIG. 5, the light source unit has a laser unit 10 and a wave guide member 20. The laser unit 10 can be a semiconductor laser, a gas laser, solid state laser or the like. The intensity of the laser beam emitted from the laser unit 10 is modulated by a modulator 20-20 in accordance with a image signal. In a case where the semiconductor laser is used as the laser unit 10, the modulator 20-20 controls the output power of the semiconductor laser in accordance with a modulation signal. In a case where the gas laser is used as the laser unit 10, the modulator 20-20 has a modulation element, such as an acoust-optic modulating element, for modulating the intensity of the laser beam emitted from the gas laser and a signal supplier for supplying a modulation signal to the acoust-optic modulating element.

The wave guide member 20 has a substrate 20-1, a wave guide layer 20-2, a focusing optical system 20-3, an ultrasonic transducer 20-4 having an interdigital electrode and a shading member 20-5. The wave guide layer 20-2 is formed on the surface of the substrate 20-1, as shown in FIG. 5 (b). For example, the substrate 20-1 is made of Y-cut $LiNbO_3$ and the wave guide layer 20-2 made of Ti diffused layer is formed on the surface of the substrate 20-1 by the thermal diffusion method. In a case where the semiconductor laser is used as the laser unit 10, the semiconductor laser (10) is placed on an end surface of the wave guide layer 20-2 by hybrid integration. Thus, the laser beam emitted from the semiconductor laser (10) is propagated through the wave guide layer 20-2. For example, a Luneberg lens is used as the focusing optical system 20-3. A shadow mask is arranged on the wave guide layer 20-2 and then a material having a high refractive index, such as $Nb_2O_5$ or $As_2S_3$, is deposited on the wave guide layer 20-2 by sputtering or evaporation, so that the Luneberg lens is formed on the wave guide layer 20-2. The surface of the Luneberg lens (20-3) is curved but is not a spherical surface. The shading member 20-5 is formed on another end surface of the wave guide member 20, which end surface is opposite to the end surface on which the semiconductor laser (10) is provided. A metal film made of Cr, Al or the like is formed on a part of the end surface of the wave guide member 20 by sputtering or evaporation. In the shading member 20-5, an edge portion 20-50 is formed. The laser beam passing through the Luneberg lens (20-3) is focused at a predetermined point by a function of the Luneberg lens (20-3).

The ultrasonic transducer 20-4 is formed on the wave guide member 20. A signal supplier 20-30 supplies a FR frequency signal to the interdigital electrode of the ultrasonic transducer 20-4 at a predetermined time. The FR frequency signal is controlled in accordance with the image information. When the signal supplier 20-30 supplies no signal to the ultrasonic transducer 20-4, the laser beam passing through the Luneberg lens (20-3) is focused at a position $P_o$ on the shading member 20-5. That is, the laser beam is entirely intercepted by the shading member 20-5. On the other hand, when the signal supplier 20-3 supplies the F frequency signal to the ultrasonic transducer 20-4, the ultrasonic transducer 20-4 excites a surface acoustic wave and the surface acoustic wave is propagated in the wave guide layer 20-2. A region where the surface acoustic wave is propagated has a function of a diffraction grating. Thus, the laser beam passing through the Luneberg lens (20-3) is deflected at the region where the surface acoustic wave is propagated and focused at a position $P_o'$ on the edge portion 20-50 of the shading member 50-5. That is, the position at which the laser beam is focused is changed by the control of the ultrasonic transducer 20-4.

Figures 6A, 6B:
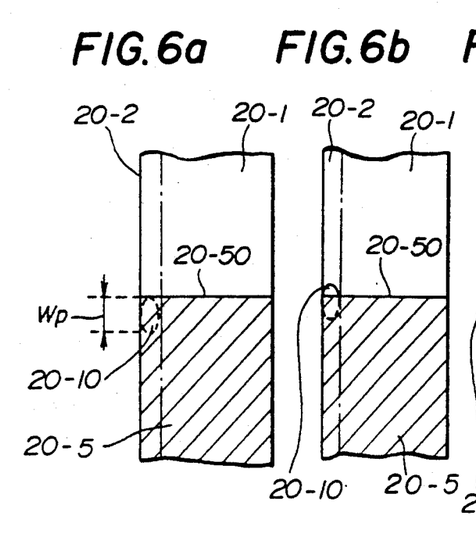
FIG. 6a–6c are diagrams illustrating relationships between a shading member and the laser beam spot.
Figure 6C:
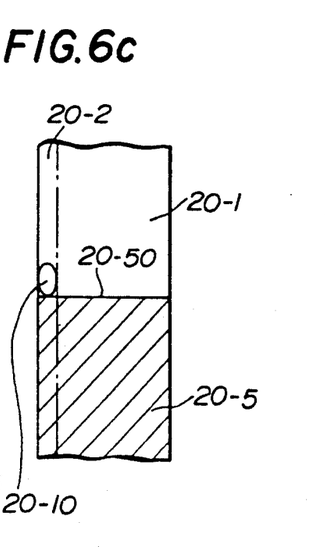

FIG. 6 shows the end surface of the wave guide member 20 on which the shading member 20-5 is formed.

Referring to FIG. 6, when the ultrasonic transducer 20-4 excites the surface acoustic wave having a frequency $f_o$, a half portion of the laser spot 20-10 is hidden by the shading member 20-5, as shown in FIG. 6 (b). When the ultrasonic transducer 20-4 excites the surface acoustic wave having a frequency $f_1$, the laser beam spot 20-10 is entirely hidden by the shading member 20-5, as shown in FIG. 6 (a). In this case, a position of an upper edge of the laser beam spot 20-10 is substantially equal to a position of the edge portion 20-50 of the shading member 20-5. When the ultrasonic transducer 20-4 excites the surface acoustic wave having a frequency $f_2$, the laser beam 20-10 entirely passes through the shading member 20-5, as shown in FIG. 6 (c). In this case, a position of a lower edge of the laser beam spot 20-10 is substantially equal to a position of the edge portion 20-50 of the shading member 20-5.

In FIG. 6, a diameter of the laser beam spot 20-10 in a direction perpendicular to the edge 20-50 of the shading member 20-5 is denoted by $W_p$.

The frequency variation $\Delta f$ of the surface acoustic wave output from the ultrasonic transducer 20-4 and the angle variation $\Delta \theta$ of the deflection angle obtained by the diffraction of the laser beam have a relationship indicated by the following formula (6).

$$\Delta \theta = [\lambda/(Ne\ V)]\Delta f \qquad (6)$$

where $\lambda$ is a wave length of the laser beam, Ne is the effective refractive index of the wave guide layer 20-2 and V is a propagation velocity of the surface acoustic wave.

When a position of the laser beam spot 20-10 is changed from a first position shown in FIG. 6 (a) to a second position shown in FIG. 6 (c), the laser beam spot 20-10 is moved for $W_p$. Thus, the relationship indicated by the following formula (7) must be obtained.

$$d\Delta \theta = W_p \qquad (7)$$

where d is a distance between the starting point Q of the deflection, shown in FIG. 5 (A), and the shading member 20-5. Then, the following formula (8) is obtained from the above formulas (6) and (7).

$$W_p = [(d\lambda)/(Ne\ V))]\Delta f \qquad (8)$$

In formula (8), $\Delta f = (f_2 - f_1)$. Thus, when d, $W_p$, $f_0$, $f_1$ and $f_2$ are determined so that the formula (8) stands, the laser beam is located at a position within a range between a first position shown in FIG. 6 (a) and a second position shown in FIG. 6 (c) by controlling the frequency of the surface acoustic wave within a range between $f_1$ and $f_2$.

The speed with which the size of the laser beam spot is changed depends on an access time $t_a$ of the ultrasonic transducer 20-4, $$t_a = D/V$$

where D is the width of the laser beam propagated in the wave guide layer 20-2 and V is the propagation speed of the surface acoustic wave. When the wave guide layer 20-2 is made of Y-cut $LiNbO_3$, the propagation speed of the surface acoustic wave is $3.49 \times 10^3$ m/sec.. Thus, when $D = 150$ $\mu$m, the access time $t_a$ is approximately equal to 43 nsec. In this case, the laser beam spot size can be rapidly changed, so that it is possible to change the dot size of every pixel on the half-tone image.

Figure 7:
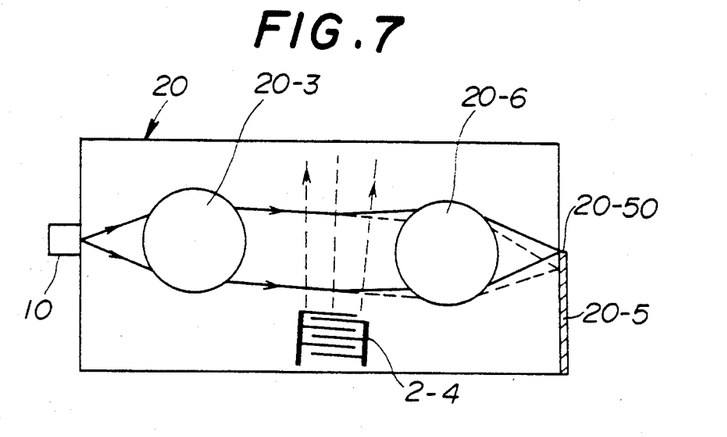
FIGS. 7 and 8 are diagrams illustrating light source units according to modifications of the second embodiment.

A description will now be given of a first modification of the light source unit with reference to FIG. 7. In FIG. 7, which shows the essential parts of the light source unit, those parts which are the same as those shown in FIG. 5 are given the same reference numbers.

In FIG. 7, two Luneberg lenses 20-3 and 20-6 used as the focusing optical system are provided on the wave guide element 20. A first Luneberg lens 20-3 collimates the laser beam emitted from the laser unit 10. A second Luneberg lens 20-6 focuses the laser beam collimated by the first Luneberg lens 20-3 at a predetermined point on the end surface of the wave guide member 20. The laser beam collimated by the first Luneberg lens 20- is deflected in accordance with the frequency of the surface acoustic wave output from the ultrasonic transducer 20-4. Then a position at which the laser beam is focused on the end surface of the wave guide member 20 is changed by the deflection of the laser beam.

Figures 8, 9:
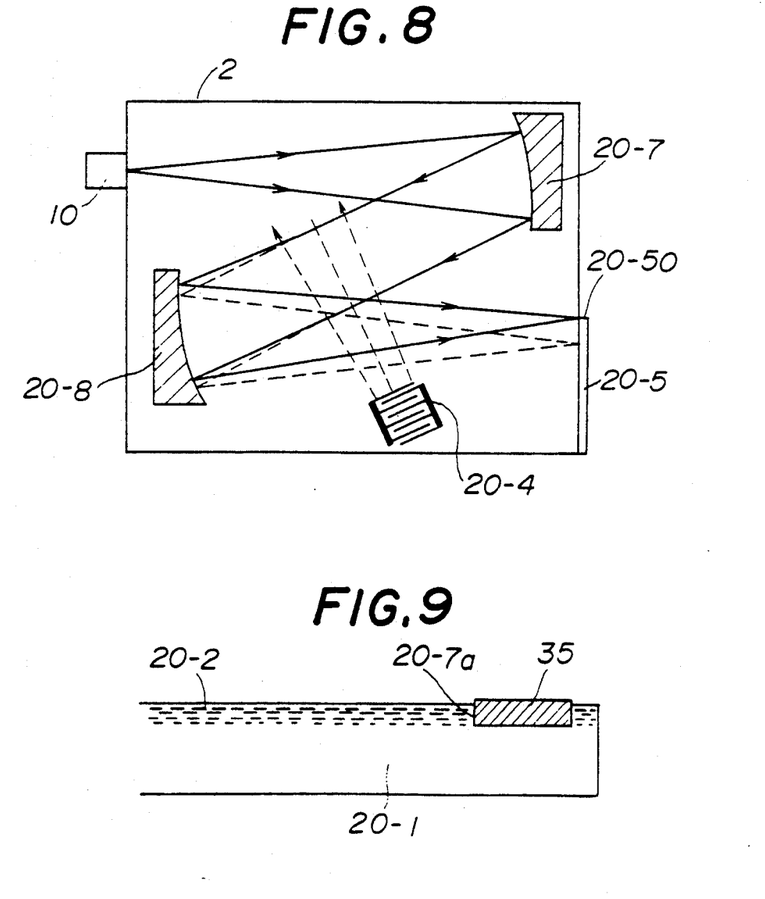
FIG. 9 is a diagram illustrating an example of a wave guide mirror shown in FIG. 8.

A description will now be given of a second modification of the light source unit with reference to FIG. 8. In FIG. 8, which shows the essential parts of the light source unit, those parts which are the same as those shown in FIG. 5 are given the same reference numbers.

In FIG. 8, two wave guide mirrors 20-7 and 20-8 used as the focusing optical system are provided on the wave guide member 20. A first wave guide mirror 20-7 collimates the laser beam emitted from the laser unit 10. A second wave guide mirror 20-8 focuses the laser beam collimated by the first wave guide mirror 20-7 at a predetermined point on the end surface of the wave guide member 20. A position at which the laser beam is focused on the end surface of the wave guide member 20 is also changed by the deflection of the laser beam.

According to the modifications shown in FIGS. 7 and 8, as the collimated laser beam is incident on the surface acoustic wave, the laser beam propagated through the wave guide 20-2 entirely satisfies the Bragg condition. Therefore, the laser beam can be more effectively deflected by the surface acoustic wave than the case of the embodiment shown in FIG. 5.

In addition, the light source unit shown in FIG. 8 can be easily made in comparison with those shown in FIG. 5 and 7, since the wave guide mirror can be easily and accurately formed on the wave guide member 20 in comparison with the Luneberg lens.

The wave wave guide mirror is formed as follows. A concave portion having a predetermined shape is formed on the wave guide layer 20-2 by photolithography and dry etching. The concave portion is filled with a metal 35 having a high reflectivity, such as Al, Ag, Au and Cu, by sputtering, as shown in FIG. 9. The laser beam propagated in the wave guide layer 20-2 is reflected by a side surface 2-7a of the metal 35. That is, the wave guide mirror is formed in the concave portion.

In FIGS. 7 and 8, the modulator 20-20 and the signal supplier 20-30 are respectively omitted for the sake of simplicity, but, in fact, the modulator 20-20 and the signal supplier 20-30 are used for the light source units shown in FIGS. 7 and 8 in the same manner as that shown in FIG. 5.

A description will now be given of an optical scanning image recording apparatus using the above light source unit, with reference to FIGS. 10 and 11.

Figures 10A, 10B, 11B, 11C, 11D, 11E, 11F, 11G:
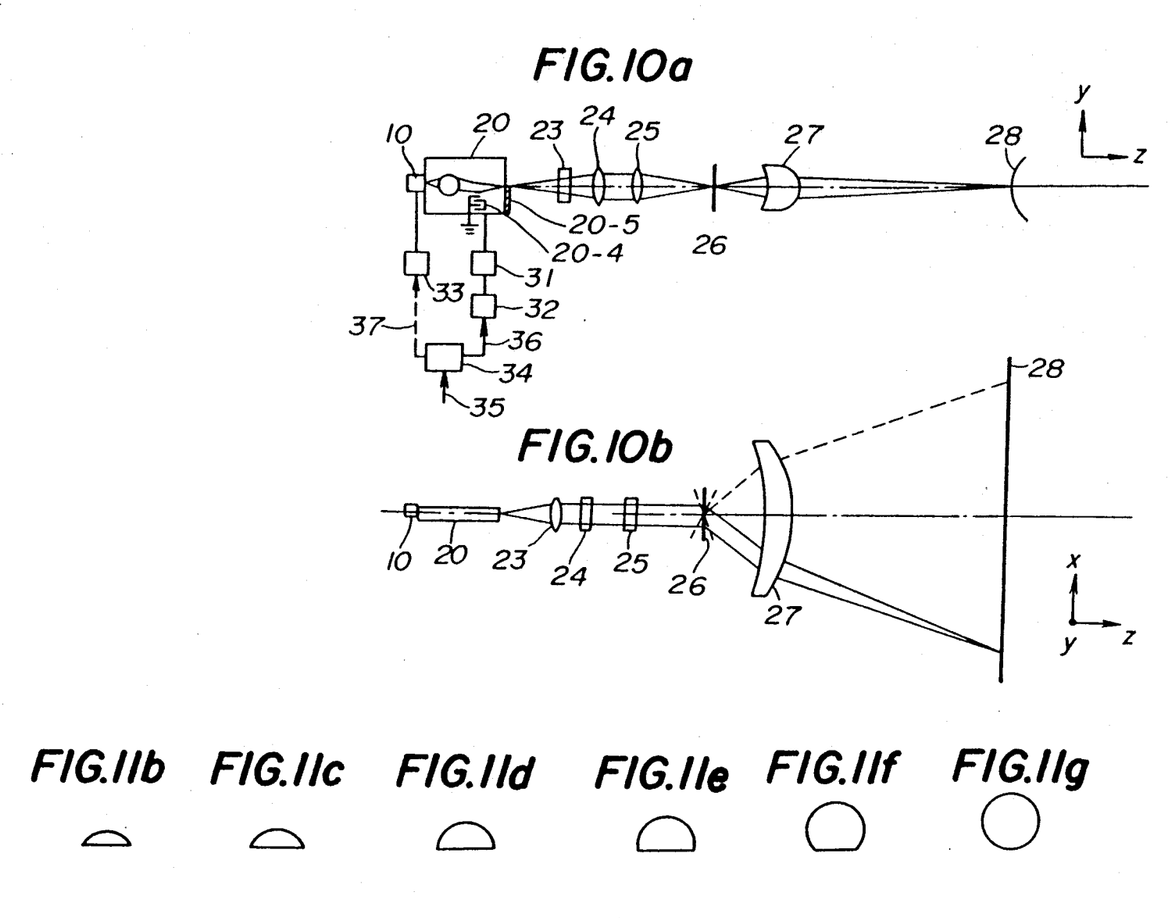
FIG. 10a and 10b are diagrams illustrating an optical scanning image recording apparatus using the light source shown in FIG. 5.
FIG. 11a–11g are diagrams illustrating variations of the laser beam spot.
Figure 11A:
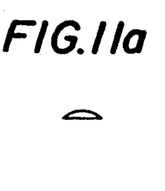

FIG. 10 illustrates an optical scanning image recording apparatus according to the second embodiment of the present invention. FIG. 10 (A) shows a side view of the optical system of the optical scanning image recording apparatus, and FIG. 10 (B) shows a plan view of the optical system of the optical scanning image recording apparatus shown in FIG. 10 (A). In FIG. 10, x denotes the main scanning direction and y denotes the sub scanning direction.

Referring to FIG. 10 (A) and (B), the laser beam emitted from the wave guide member 20 of the light source unit described above passes through cylindrical lenses 23, 24, and 25 and is focused on the surface of the polygonal mirror 26 which is rotated in a predetermined direction. The laser beam reflected by the polygonal lens 26 is incident to a f-$\theta$ lens 27. Then, the laser beam passing through the f-$\theta$ lens 27 is projected onto a surface of a photosensitive member 28. The f-$\theta$ lens 27 is an anamorphic optical member, and with respect to the sub scanning direction, the surface of the polygonal mirror 26 and the surface of the photosensitive member 28 have a conjugate relationship of imaging.

In addition, with respect to both the main scanning direction and the sub scanning direction, the edge portion 20-50 of the shading member 20-5 formed on the wave guide member 20 and the surface of the photosensitive member 28 have the conjugate relationship of imaging, due to the functions of cylindrical lenses 23, 24 and 25 and f-$\theta$ lens 27. An image corresponding to the image of a laser beam spot formed on a plane provided with the edge portion 20-50 is formed on the surface of the photosensitive member 28. The size of the laser beam spot projected onto the surface of the photosensitive member 28 depends on the degree of shading of the laser beam by the shading member 20-5 and the magnification of an optical system including the cylindrical lenses 23, 24, and 25 and the f-$\theta$ lens 27.

In the optical scanning image recording apparatus described above, the amount of laser beam shaded by the shading member 20-5 is changed by the ultrasonic transducer 20-4, so that the size of the laser beam spot projected onto the surface of the photosensitive member 28 can be changed in the sub scanning direction. For example, the dot size, which is the size of the laser beam projected onto the surface of the photosensitive member 28, can be changed into seven sizes, as shown in FIG. 11 (a) (b) (c) (d) (e) (f) and (g), in the same manner as that shown in FIG. 4.

In FIG. 10, the optical scanning image recording apparatus also has a FR frequency power amplifier 31, a voltage control oscillator 32, a driver 33 and a controller 34. The driver 33 includes the modulator 20-20 shown in FIG. 5. The controller 34 outputs a control signal 36 in synchronism with an image clock signal. The control signal 36 output from the controller 34 corresponds to half-tone levels included in the image signal. The control signal 36 is supplied to the voltage control oscillator 32 and then the voltage control oscillator 32 outputs a FR frequency signal having a frequency corresponding to the voltage level of the control signal 36. The FR frequency power amplifier 31 amplifies the FR frequency signal output from the voltage control oscillator 32 and supplies the amplified FR frequency signal to the ultrasonic transducer 20-4. When the FR frequency signal is supplied to the ultrasonic transducer 20-4, the ultrasonic transducer 20-4 outputs a surface acoustic wave having a frequency corresponding to the frequency of the FR frequency signal supplied thereto. Thus, the laser beam propagated in the wave guide member 20 is deflected by the surface acoustic wave. The controller 34 also outputs a driving pulse signal 37 in synchronism with the image clock signal, and the driving pulse signal 3 is supplied to the driver 33. Thus the driver 33 modulates the laser unit 10 on the basis of the driving pulse signal 37.

In the above case, the FR frequency power amplifier 31, the voltage control oscillator 32 and the controller 34 correspond to the signal supplier 20-30 shown in FIG. 5.

A description will now be given of a third embodiment of the present invention with reference to FIGS. 12A through 16.

Figure 12A:
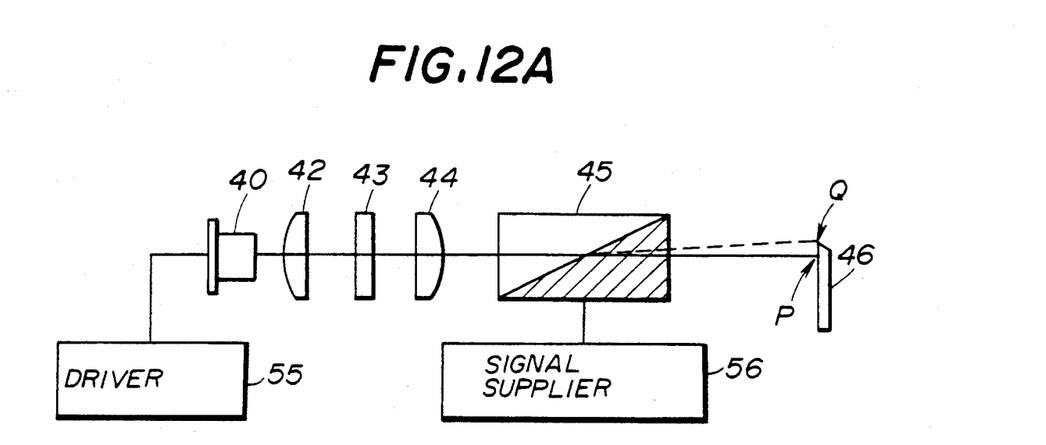
FIG. 12A is a diagram illustrating a light source unit according to a third embodiment of the present invention.

FIG. 12A shows a light source unit according to the third embodiment of the present invention.

Referring to FIG. 12A, the light source unit has a semiconductor laser unit 40, a collimator lens 42, cylindrical lenses 43 and 44, an electrooptic deflection element 45 and a shading member 46. A laser beam emitted from the semiconductor laser unit 40 is collimated by the collimator lens 42. The laser beam passing through the collimator lens 42 is focused by the cylindrical lens 43 in a direction perpendicular to the sheet on which FIG. 12A is drawn. The cylindrical lens 43 focuses the laser beam so that a laser beam spot image is formed on a plane positioned at the center of the electrooptic deflection element 45. The plane of polarization of the laser beam is perpendicular to the sheet on which FIG. 12A is drawn. The laser beam passing through the cylindrical lens 43 is focused by the cylindrical lens 44 in a direction parallel to the sheet on which FIG. 12A is drawn. The laser beam passing through the cylindrical lens 44 further passes through the electrooptic deflection element 45 and goes toward the shading member 46. When the laser beam is not deflected by the electrooptic deflection element 45, the laser beam is focused at a point P on the shading member 46 by the cylindrical lens 44. That is, the laser beam is entirely shaded by the shading member 46 when no voltage signal is supplied to the electrooptic deflection element 45. A knife-edge Q is formed on an end of the shading member 46.

Figure 12B:
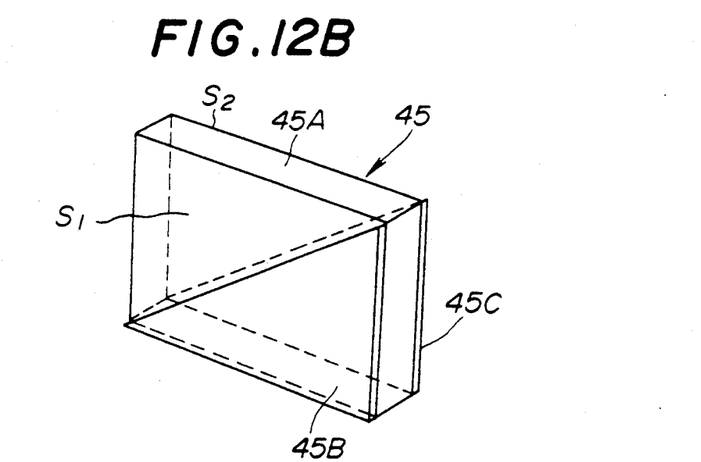
FIG. 12B is a perspective view of an electrooptic deflection element shown in FIG. 12A.

The electrooptic deflection element 45 has an electrooptic crystal 45A, such as PLZT, LiNbO$_3$ or LiTaO$_3$, and two electrodes 45B and 45C, as shown in FIG. 12B. The electrooptic crystal 45A is a rectangular shaped plate and each of the electrodes 45B and 45C has a triangular shape. The electrode 45B is provided on a surface S$_1$ of the electrooptic crystal 45A and the electrode 45C is provided on another surface S$_2$ of the electrooptic crystal 45A. Each of the electrodes 45B and 45C covers an area which is half of a corresponding surface S$_1$ or S$_2$.

Figure 12C:
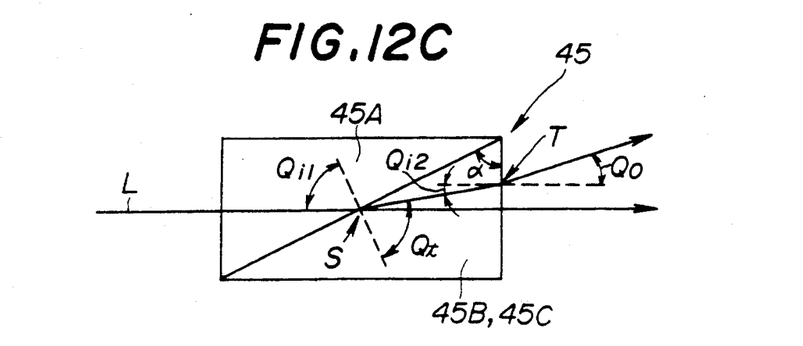
FIG. 12C is a diagram illustrating the laser beam passing through the electrooptic deflection element.

FIG. 12C is a diagram illustrating the laser beam passing through the electrooptic crystal 45A.

Referring to FIG. 12C, when no voltage signal is applied between the electrodes 45B and 45C, the laser beam L passes straight through the electrooptic crystal 45A. When the voltage signal is applied between the electrodes 45B and 45C, a refractive index in a portion of the electrooptic crystal 45A put between the electrodes 45B and 45C is changed. Therefore, the laser beam L incident on the electrooptic crystal 45A is refracted at a boundary surface between a portion in which the refractive index is not changed and the portion in which the refractive index is changed. That is, the laser beam is deflected by the electrooptic deflection element 45.

In FIG. 12 C, the incident angle of the laser beam L at a point S is $\theta_{i1}$, the refraction angle of the laser beam at the point S is $\theta_t$, the incident angle of the laser beam L at a point T is $\theta_{i2}$, and the refraction angle of the laser beam L at the point T is $\theta_o$. In this case, the following formulas (9) and (10) stand based on Snell's law.

$$n_o \sin \theta_{i1} = n(V) \sin \theta_t \qquad (9)$$

$$n(V) \sin \theta_{i2} = \sin \theta_o \qquad (10)$$

where $n_o$ is a refraction index of the electrooptic crystal 45A when no voltage signal is supplied to the electrooptic crystal 45A, and n(V) is a refraction index of the electrooptic crystal 45A when the voltage signal V is supplied to the electrooptic crystal 45A.

When the vertical angle of each of the electrodes 45B and 45C is denoted by $\alpha$, the following formula (11) stands.

$$\alpha = \theta_t - \theta_{i2} \qquad (11)$$

The following formula (12) is obtained on the basis of the above formulas (9) (10) and (11).

$$\sin\theta_o = \sin\alpha[n^2(V) - n_o^2\sin^2\theta_{i1}]^{\frac{1}{2}} - n_o\cos\alpha \sin\theta_{i1} \qquad (12)$$

When the above formula (12) is differentiated by n(v), a relationship between the variation $\Delta n$ of the refractive index and the variation $\Delta\theta_o$ of the refraction angle, with respect to the voltage variation, is obtained as follows.

$$\Delta\theta_o = [\sin\alpha/\cos\theta_o] \times n(V)\Delta n/[n^2(V) - n_o^2\sin^2\theta_{i1}]^{\frac{1}{2}}. \qquad (13)$$

The variation $\theta_o$ of the refraction angle corresponds to the variation of the deflection angle of the laser beam.

When the electrooptic crystal is a material, such as PLZT, which has the quadratic electrooptic effect, and the plane of polarization of the laser beam L is perpendicular to the laser beam L, n(V) and $\Delta n$ are respectively obtained by the following formulas (14) and (15).

$$n(V) = n_o[1 - (\tfrac{1}{2})n_o^2 R_{ij}E^2] \qquad (14)$$

$$\Delta n = -(\tfrac{1}{2})n_o^3 R_{ij}E^2 \qquad (15)$$

where $R_{ij}$ is the quadratic electrooptic coefficient and E is the electric field intensity when the voltage V is supplied to the electrical crystal. Thus, the following relationship between the electric field intensity E and variation $\Delta\theta_o$ of the deflection angel of the laser beam (refraction angle) is obtained.

$$\Delta\theta_o = -[\sin\alpha/2\cos\theta_0] \times n_o^3 R_{ij}E^2/[1 - \sin^2\theta_{i1} - n_o^2 R_{ij}E^2]^{\frac{1}{2}} \qquad (16)$$

Figure 13:
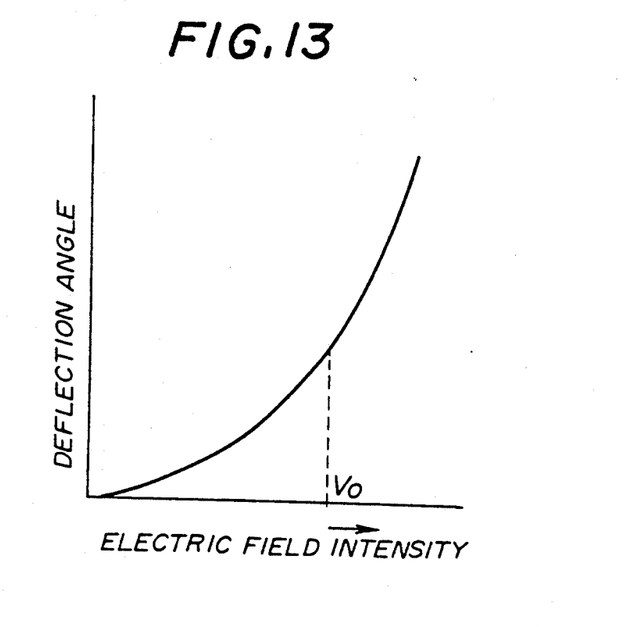
FIG. 13 is a graph showing a relationship between an electric field intensity in the electrooptic deflection element and a deflection angle of the laser beam.

That is, the deflection angel of the laser beam is substantially in proportion to the square of the electric field intensity E, as shown in FIG. 13.

Figure 15A:
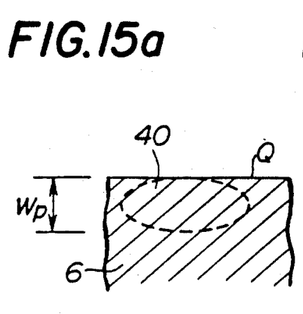
FIG. 15a-15c are diagrams illustrating relationships between the shading member and the laser beam spot.
Figure 15B:
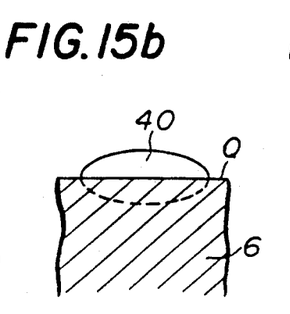
Figure 15C:
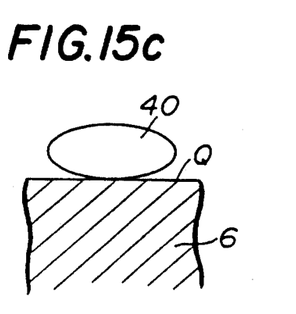
Figure 16A:
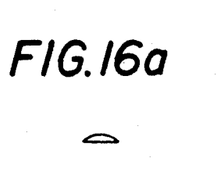
FIG. 16a-16g are diagrams illustrating variations of the laser beam spot.
Figure 16B:
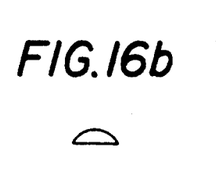
Figure 16C:
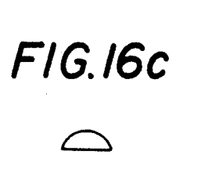
Figure 16D:
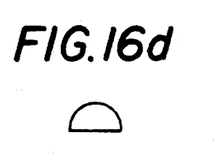
Figure 16E:
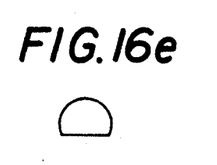
Figure 16F:
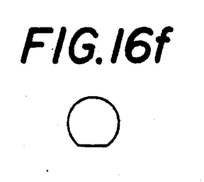
Figure 16G:
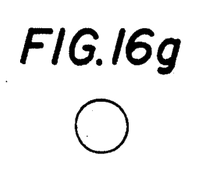

FIG. 15 shows the edge Q and an adjacent portion of the shading member 46 and the laser beam spot. The laser beam is focused at the center of the electrooptic deflection element 45 by the cylindrical lens 43 and then the focused laser beam is dispersed, so that the laser spot 40 formed on a plane on which the shading member 46 is provided has an oval shape.

Figure 14A:
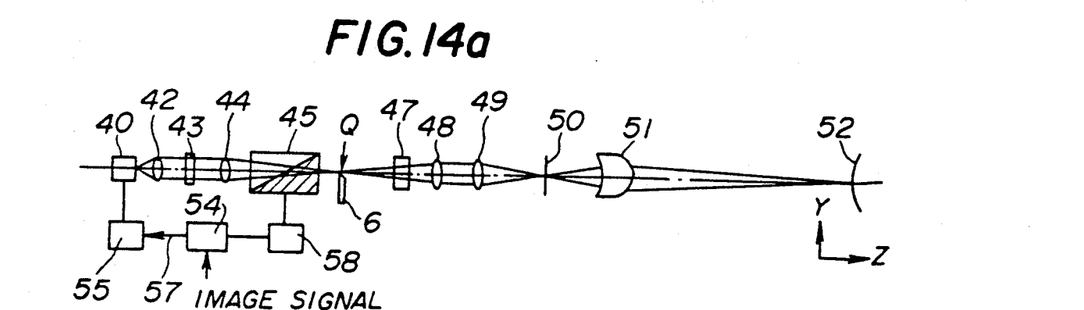
FIG. 14a and 14b are diagrams illustrating an optical scanning image recording apparatus using the light source shown in FIG. 12A.

Referring to FIG. 15, when the voltage $V_o$ is supplied to the electrooptic deflection element 45, half of the laser beam spot 40 is hidden by the shading member 46, as shown in FIG. 15 (b). When the voltage ($V_o - \Delta V$) is supplied to the electrooptic deflection element 45, the laser beam spot 40 is entirely hidden by the shading member 46, as shown in FIG. 14 (a). In this case, the position of an upper edge of the laser beam spot 40 is substantially equal to the position of the edge Q of the shading member 46. When the voltage ($V_o + \Delta V$) is supplied to the electrooptic deflection element 45, the laser beam 40 entirely passes through the shading member 46, as shown in FIG. 15 (c). In this case, the position of a lower edge of the lase beam spot 40 is substantially equal to the position of the edge Q of the shading member 46. The length of the laser beam spot 40 in an up and down direction is denoted by Wp, as shown in FIG. 15.

In the light source unit described above, when the voltage V supplied to the electrooptic deflection element 45 is controlled within a range between $V_0 - \Delta V$ and $V_0 + \Delta V$, the laser beam is located at a position within a range between a first position shown in FIG. 15 (a) and a second position shown in FIG. 15 (c).

When the electrooptic crystal 45A is PLZT, the deflection angle is in proportion to the square of the voltage supplied to the PLZT, as shown in FIG. 13. Thus, the voltage supplied to the PLZT is controlled within a voltage range whose center is $V_o$. When $V_o$ is the voltage within a range in which the quadric curve denoting the relationship between the deflection angle and the voltage as shown in FIG. 13 is greatly inclined, the voltage variation required for the deflection of the laser beam can be small.

When the electrooptic crystal is either $LiNbO_3$ or $LiTaO_3$ and the laser beam is deflected due to the Pockels effect of the electrooptic crystal, the voltage supplied to the electrooptic crystal is in proportion to the deflection angle. Thus, the lowest voltage $(V_o - \Delta V)$ supplied to the electrooptic crystal can be "0" volt.

A description will now be given of an optical scanning image recording apparatus using the above light source unit with reference to FIG. 14.

Figure 14B:
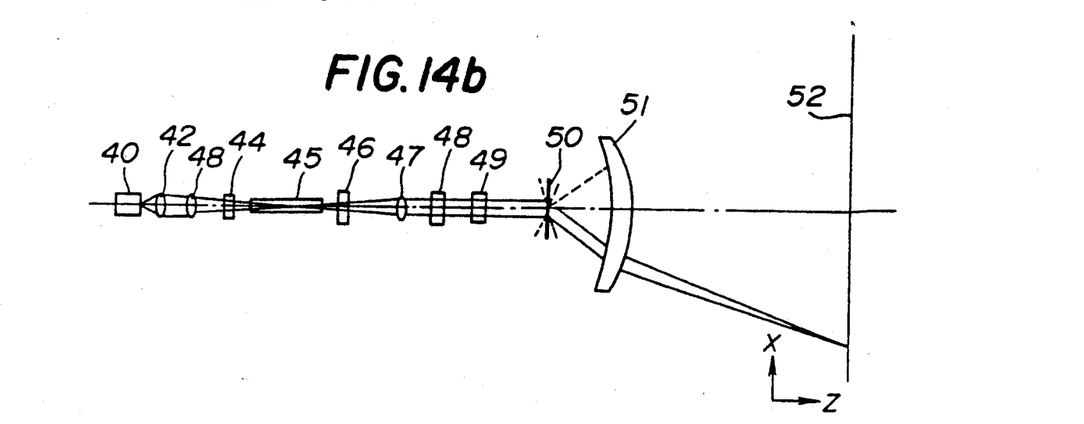

FIG. 14 (A) shows a side view of the optical system of the optical scanning image recording apparatus, and FIG. 14 (B) shows a plan view of the optical system of the optical scanning image recording apparatus shown in FIG. 10 (A). In FIG. 14, x denotes the main scanning direction and y denotes the sub scanning direction.

Referring to FIG. 14 (A) and (B), the above mentioned light source unit having the semiconductor laser 40, the collimator lens 42, cylindrical lenses 43 and 44 the electrooptic deflection element 45 and the shading member 46, emits the laser beam having a beam spot size controlled as has been described above. The laser beam emitted from the light source unit passes through cylindrical lenses 47,48 and 49 and is incident to a polygonal mirror 50 rotated in a predetermined direction. The laser beam reflected by the polygonal mirror 50 passes through a f-θ lens 51 and is projected onto a surface of a photosensitive member 52. A cylindrical lens 47 collimates the laser beam in the main scanning direction and a cylindrical lens 48 collimates the laser beam in the sub scanning direction.

The f-θ lens 51 is an anamorphic optical member, and with respect to the sub scanning direction, the surface of the polygonal mirror 50 and the surface of the photosensitive member 52 has a conjugate relationship of imaging.

In addition, with respect to the main scanning direction, a plane, on which the laser beam is focused by the cylindrical lens 43, positioned at the center of the electrooptic deflection element 45 and the surface of the photosensitive member 52 have the conjugate relationship of imaging due to the functions of the cylindrical lens 47 and the f-θ lens 51. With respect to the sub scanning direction, a plane on which the edge Q of the shading member 46 is provided and the surface of the photosensitive member 52 have the conjugate relationship of imaging due to the functions of the cylindrical lenses 47, 48 and 49 and the f-θ lens 51. Thus, with respect to the sub scanning direction, an image corresponding to the image of the laser beam spot formed on the plane provided with the edge Q of the shading member 46 is formed on the surface of the photosensitive member 52. The length of the laser beam spot in the sub scanning direction on the surface of the photosensitive member 52 depends on the degree of shading of the laser beam by the shading member 46 and the magnification of an optical system including the cylindrical lenses 48 and 49 and the f-θ lens 51 in the sub scanning direction. With respect to the main scanning direction, an image corresponding to the image formed o the plane positioned at the center of the electrooptic deflection member 45 is formed on the surface of the photosensitive member 52. Thus, the length of the laser beam spot in the main scanning direction on the surface of the photosensitive member 52, depends on the length of the laser beam spot which is formed on the plane positioned at the center of the electrooptic deflection element 45 and the magnification of a optical system including the cylindrical lens 47 and the f-θ lens 51 in the main scanning direction.

The electrooptic deflection element 45 deflects the laser beam in the sub scanning direction. Thus, the laser beam spot size can be changed by the control of the electrooptic deflection element 45. For example, the dot size, which is the size of the laser beam spot projected onto the surface of the photosensitive member 52, can be changed into seven sizes as shown in FIG. 16 (a) (b) (c) (d) (e) (f) and (g), in the same manner as that shown in FIGS. 4 and 11.

In FIG. 14, the optical scanning image recording apparatus also has a controller 54, a driver 55 driving the semiconductor laser 40 and a voltage signal generator 58. The controller 54 outputs a dot size control signal corresponding to the half-tone level included in the image signal and the voltage signal generator 58 supplies a voltage signal having a level corresponding to the dot size control signal to the electrooptic deflection element 45. Thus, the laser beam is shaded in accordance with the dot size control signal by the shading member 46. The controller 54 also outputs a driving pulse signal 57 and then the driving pulse signal is supplied to the driver 55. Thus the driver 55 modulates the semiconductor laser 40 on the basis of the driving pulse signal 57.

In the above case, the voltage signal generator 58 and the controller 54 form a signal supplier 56 shown in FIG. 12A.

Figure 17A:
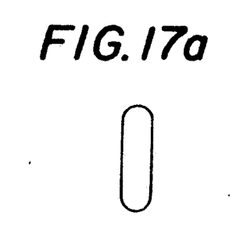
FIG. 17a-17c are diagrams illustrating an example of a state where the size of the laser beam spot in the main scanning direction is controlled.
Figure 17B:
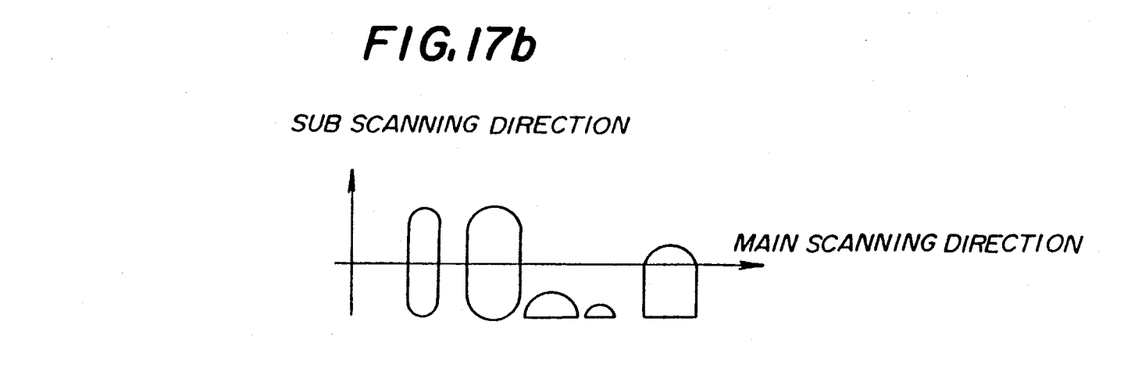
Figure 17C:
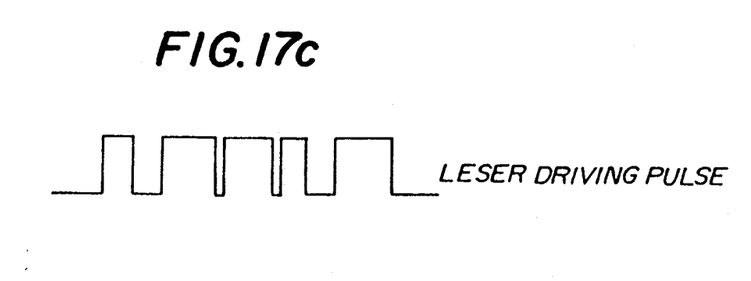

A description will now be given of an example of a system controlling the laser beam spot size in the main scanning direction. The laser beam dot size in the sub scanning direction and that in the main scanning direction can be independently controlled at the same time.

The laser beam spot is long in the sub scanning direction, as shown in FIG. 17 (a). For example, the laser beam spot is oval or rectangular. In FIG. 14, the controller 54 supplies the driving pulse signal 57 to the driver 55 and the driver 55 modulates the semiconductor laser 40 on the basis of the driving pulse signal 57. The controller 54 controls the width of the driving pulse signal 57 in accordance with image information with respect to the main scanning direction, as shown in FIG. 17 (c). When the driving pulse signal 57 shown in FIG. 17 (c) is supplied to the semiconductor laser 40 and the laser beam dot size is controlled as has been described above, the dot size in the main scanning direction and that in the sub scanning direction are independently controlled, as shown in FIG. 17 (b).

The control of the size of the laser beam spot in the main scanning direction can also be performed as follows. That is, when the semiconductor laser 40 is continuously oscillated (CW-oscillation), the time in which the voltage signal is supplied to the electrooptic deflection element 45 is controlled. Thus, the laser beam spot size corresponding to the time in which the voltage signal is supplied to the electrooptic deflection element 45 is obtained.

According to the present invention, the size of the laser beam spot of every pixel can be changed and it is possible to rapidly record the half-tone image on the recording medium.

The present invention is not limited to the aforementioned embodiments, and variations and modifications ma be made without departing from the scope of the claimed invention.

What is claimed is:

1. A light source unit comprising:

light emitting means for emitting a light beam;

deflection means, coupled to said light emitting means, for deflecting said light beam emitted from said light emitting means and for outputting a deflected light beam, a deflection angle of said deflected light beam being controlled by a control signal supplied from an external controller to said deflection means; and shading means, coupled to said deflection means, for partly shading said deflected light beam output from said deflection means, a spot size of a light beam passing through said shading means being changed in accordance with the deflection angle of said deflected light beam, wherein said light source unit outputs the light beam passing through said shading means.

2. A light source unit as claimed in claim 1, wherein said deflection means has acoust-optic deflection means for deflecting the light beam by use of an ultrasonic wave.

3. A light source unit as claimed in claim 2, wherein said acoust-optic deflection means has an ultrasonic transducer outputting an ultrasonic wave having a frequency corresponding to a frequency of a control signal supplied to said ultrasonic transducer, and an ultrasonic medium in which the ultrasonic wave output from said ultrasonic transducer and the light beam emitted from said light beam emitting means are respectively propagated, wherein the deflection angle of the light beam propagated in said ultrasonic medium is changed in accordance with the frequency of said ultrasonic wave propagated in said ultrasonic medium.

4. A light source unit as claimed in claim 2, wherein said acoust-optic deflection means has an ultrasonic transducer outputting an ultrasonic wave having a frequency corresponding to a frequency of a control signal supplied to said ultrasonic transducer, and a wave guide member in which the light beam emitted from said light beam emitting means and a surface acoustic wave corresponding to said ultrasonic wave output from said ultrasonic transducer are respectively propagated, wherein the deflection angle of the light beam propagated in said ultrasonic medium is changed in accordance with the frequency of said surface acoustic wave propagated in said ultrasonic medium.

5. A light source unit as claimed in claim 4, wherein said wave guide member has a substrate, a wave guide layer formed on said substrate and a focusing system formed on said wave guide layer, the light beam emitted from said light emitting means being propagated in said wave guide layer and focused on a plane on which said shading means is provided by said focusing system, and wherein said surface acoustic wave is propagated in said wave guide layer.

6. A light source unit as claimed in claim 5, wherein said focusing system has a Luneberg lens which focuses the light beam on the plane on which said shading means is provided.

7. A light source unit as claimed in claim 5, wherein said light emitting member is provided on a first end surface of said wave guide layer and said shading means is provided on a second end surface of said wave guide, said first end surface and said second end surface being opposite to each other.

8. A light source unit as claimed in claim 5, wherein said focusing system has a first optical member which collimates the light beam emitted from said light emitting means and a second optical member which focuses a light beam collimated by said first optical member on the plane on which said shading member is provided, and wherein said surface acoustic wave is propagated in a region where the light beam collimated by said first optical member is propagated.

9. A light source unit as claimed in claim 8, wherein said first optical member and said second optical member each has a Luneberg lens.

10. A light source unit as claimed in claim 8, wherein said first optical member has a first wave guide mirror which reflects the light beam emitted from said light emitting means and collimates the light beam and a second optical member has a second wave guide mirror which focuses a light beam reflected by said first wave guide mirror on the plane on which said shading means is provided, and wherein said surface acoustic wave is propagated in a region where the light beam collimated by said first wave guide mirror is propagated.

11. A light source unit as claimed in claim 1, wherein said deflection means has an electrooptic deflection means for deflecting the laser beam by use of an electrooptic effect.

12. A light source unit as claimed in claim 11, wherein said electrooptic deflection means has an electrooptic crystal in which the light beam emitted from said light emitting means is propagated, and electrodes between which a part of said electrooptic crystal is put, a control voltage being applied between said electrodes, wherein a refractive index of said part put between said electrodes is changed in accordance with the control voltage applied between said electrodes so that the deflection angle of said light beam propagated in said electrooptic crystal is changed.

13. An optical scanning image forming apparatus comprising:

a light source unit for outputting a light beam, a spot size of said light beam being controlled by a control signal supplied from a controller external to said light source;

a recording medium on which an image is formed by optical scanning; and an optical system provided between said light source unit and said recording medium, said optical system moving said light beam output from said light source unit so that said light beam moved by said optical system scans a surface of said recording medium, wherein said light source unit comprises:

light emitting means for emitting a light beam;

deflection means, coupled to said light emitting means, for deflecting said light beam emitted from said light emitting means and for outputting a deflected light beam, a deflection angle of said deflected light beam being controlled by a control signal supplied from an external controller to said deflection means; and shading means, coupled to said deflection means, for partly shading said deflected light beam output from said deflection means, a spot size of a light beam passing through said shading means being changed in accordance with the deflection angle of said deflected light beam, said light source unit outputting the light beam passing through said shading means.

14. An optical scanning image recording apparatus as claimed in claim 13, wherein said optical system has one or a plurality of optical members for moving the light beam output from said light source unit by guiding said light beam output so as to scan the surface of said recording medium and forming an image, corresponding to an image formed on a plane on which said shading means is provided, on the surface of said recording medium so that the plane on which said shading means is provided and the surface of said recording medium have a conjugate imaging relationship.

15. A light source unit as claimed in claim 13, wherein said deflection means has acousto-optic deflection means for deflecting the light beam by using an ultrasonic wave.

16. A light source unit as claimed in claim 15, wherein said acousto-optic deflection means has an ultrasonic tranducer outputting an ultrasonic wave having a frequency corresponding to a frequency of a control signal supplied to said ultrasonic tranducer, and an ultrasonic medium in which the ultrasonic wave output from said ultrasonic transducer and the light beam emitted from said light beam emitting means are respectively propagated, wherein the deflection angle of the light beam propagated in said ultrasonic medium is changed in accordance with the frequency of said ultrasonic wave propagated in said ultrasonic medium.

17. A light source unit as claimed in claim 15, wherein said acousto-optic deflection means has a ultrasonic transducer outputting an ultrasonic wave having a frequency corresponding to a frequency of a control signal supplied to said ultrasonic transducer, and a wave guide member in which the light beam emitted from said light beam emitting means and a surface acoustic wave corresponding to said ultrasonic wave output from said ultrasonic transducer are respectively propagated, wherein the deflection angle of the light beam propagated in said wave guide member is changed in accordance with the frequency of said surface acoustic wave propagated in said wave guide member.

18. A light source unit as claimed in claim 17, wherein said wave guide member has a substrate, a wave guide layer formed on said substrate and a focusing system formed on said wave guide layer, the light beam emitted from said light emitting means being propagated in said wave guide layer and focused on a plane on which said shading means is provided by said focusing system, and wherein said surface acoustic wave is propagated in said wave guide layer.

19. A light source unit as claimed in claim 18, wherein said focusing system has a Luneberg lens which focuses the light beam on the plane on which said shading means is provided.

20. A light source unit as claimed in claim 18, wherein said light emitting means is provided on a first end surface of said wave guide layer and said shading means is provided on a second end surface of said wave guide layer, said first end surface and said second end surface being opposite to each other.

21. A light source unit as claimed in claim 18, wherein said focusing system has a first optical member which collimates the light beam emitted from said light emitting means and a second optical member which focuses the light beam collimated by said first optical member on the plane on which said shading member is provided, and wherein said surface acoustic wave is propagated in a region where the light beam collimated by said first optical member is propagated.

22. A light source unit as claimed in claim 21, wherein said first optical member and said second optical member each has a Luneberg lens.

23. A light source unit as claimed in claim 21, wherein said first optical member has a first wave guide mirror which reflects the light beam emitted from said light emitting means and collimates the light beam and a second optical member has a second wave guide mirror which focuses a light beam reflected by said first wave guide mirror on the plane on which said shading means is provided, and wherein said surface acoustic wave is propagated in a region where the light beam collimated by said first wave guide mirror is propagated.

24. A light source unit as claimed in claim 13, wherein said deflection means has an electrooptic deflection means for deflecting the laser beam by use of an electrooptic effect.

25. A light source unit as claimed in claim 24, wherein said electrooptic deflection means has an electrooptic crystal in which the light beam emitted from said light emitting means is propagated, and electrodes between which a part of said electrooptic crystal is put, a control voltage being applied between said electrodes, wherein a refractive index of said part of said electrooptic crystal put between said electrodes is changed in accordance with the control voltage applied between said electrodes so that the deflection angle of said light beam propagated in said electrooptic crystal is changed.

26. An optical scanning image recording apparatus as claimed in claim 13, wherein said deflection means deflects said light beam emitted from said light emitting means in a direction perpendicular to a direction in which said light beam scans the surface of said recording medium.

* * * * *